United States Patent
Dai et al.

(10) Patent No.: US 10,903,968 B2
(45) Date of Patent: Jan. 26, 2021

(54) INFORMATION TRANSMISSION METHOD AND DEVICE, AND COMPUTER STORAGE MEDIUM

(71) Applicant: ZTE CORPORATION, Shenzhen (CN)

(72) Inventors: Jianqiang Dai, Shenzhen (CN); Bo Dai, Shenzhen (CN); Zhifeng Yuan, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 60 days.

(21) Appl. No.: 16/301,174

(22) PCT Filed: Nov. 11, 2016

(86) PCT No.: PCT/CN2016/105516
§ 371 (c)(1),
(2) Date: Nov. 13, 2018

(87) PCT Pub. No.: WO2017/193564
PCT Pub. Date: Nov. 16, 2017

(65) Prior Publication Data
US 2019/0296883 A1    Sep. 26, 2019

(30) Foreign Application Priority Data

May 13, 2016  (CN) .......................... 2016 1 0323495

(51) Int. Cl.
*H04L 5/00* (2006.01)
*H04W 72/12* (2009.01)
*H04L 1/00* (2006.01)

(52) U.S. Cl.
CPC .............. *H04L 5/0091* (2013.01); *H04L 1/00* (2013.01); *H04L 5/0023* (2013.01); *H04L 5/0053* (2013.01); *H04W 72/1273* (2013.01)

(58) Field of Classification Search
CPC . H04W 72/1273; H04L 5/0053; H04L 5/0091
See application file for complete search history.

(56) References Cited

U.S. PATENT DOCUMENTS

2015/0351081 A1* 12/2015 Zhu ..................... H04L 5/0053
                                                           370/329
2016/0309542 A1* 10/2016 Kowalski ............. H04W 76/27
(Continued)

FOREIGN PATENT DOCUMENTS

CN          101692739 A       4/2010
CN          102083226 A       6/2011
(Continued)

OTHER PUBLICATIONS

EP Search Report cited in EP Application No. 16901519.5 dated Apr. 29, 2019, 8 pgs.
(Continued)

*Primary Examiner* — Maharishi V Khirodhar
*Assistant Examiner* — Kenneth P Hunt
(74) *Attorney, Agent, or Firm* — Cooper Legal Group, LLC

(57) ABSTRACT

Provided are an information transmission method and device, and a computer storage medium. The method includes sending signal indication information to a receiver and transmitting a signal according to the signal indication information; the signal indication information includes at least one of the following: a transmission mode, interference layer information, power ratio indication information, precoding or port information and physical resource block (PRB) indication information.

15 Claims, 2 Drawing Sheets

Signal indication information is sent to a receiver and a signal is transmitted according to the signal indication information, the signal indication information including at least one of: a transmission mode, interference layer information, power ratio indication information, precoding or port information and PRB indication information    ⟋ S102

(56) References Cited

U.S. PATENT DOCUMENTS

| | | | | |
|---|---|---|---|---|
| 2017/0041906 A1* | 2/2017 | Tsai | ............ | H04L 5/0037 |
| 2017/0208568 A1* | 7/2017 | Nam | ............ | H04L 5/0048 |
| 2017/0230135 A1* | 8/2017 | Oh | ............ | H04L 1/001 |
| 2017/0230942 A1* | 8/2017 | Lim | ............ | H04L 5/02 |
| 2018/0027441 A1* | 1/2018 | Kim | ............ | H04B 7/0452 |
| | | | | 370/311 |
| 2018/0076993 A1* | 3/2018 | Seo | ............ | H04J 15/00 |
| 2018/0368111 A1* | 12/2018 | Yamada | ............ | H04W 72/042 |

FOREIGN PATENT DOCUMENTS

| | | |
|---|---|---|
| CN | 102111256 A | 6/2011 |
| CN | 104410596 A | 3/2015 |
| CN | 104980389 A | 10/2015 |
| CN | 105323855 A | 2/2016 |
| JP | 2014230196 A | 12/2014 |
| KR | 20130018074 A | 2/2013 |
| KR | 20140093222 A | 7/2014 |

OTHER PUBLICATIONS

"RAN 1—Chairman's Notes", Apr. 2016, 3GPP TSG RAN WG! Meeting #84bis, Busan, Korea, 120 pgs.

Int. Search Report cited in Chinese Application No. PCT/CN2016/105516 dated Feb. 6, 2017, 5 pgs.

\* cited by examiner

Signal indication information is sent to a receiver and a signal is transmitted according to the signal indication information, the signal indication information including at least one of: a transmission mode, interference layer information, power ratio indication information, precoding or port information and PRB indication information ⌒ S102
FIG. 1
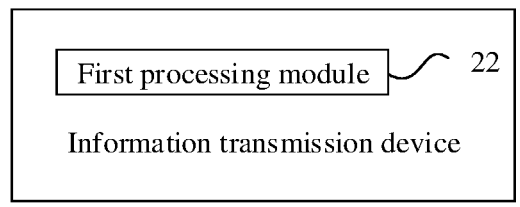
FIG. 2
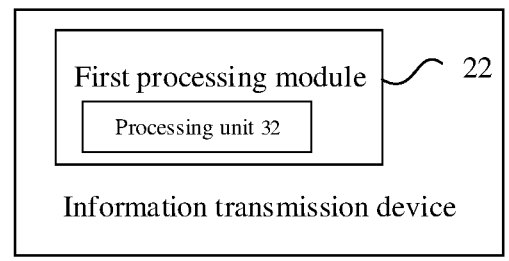
FIG. 3
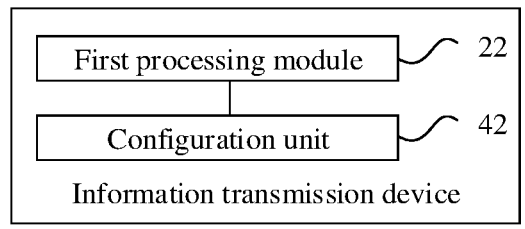
FIG. 4

Signal indication information sent by a transmitter is received and a target signal is demodulated according to the signal indication information, the signal indication information including at least one of: a transmission mode, interference layer information, power ratio indication information, precoding or port information and PRB indication information — S502

FIG. 5

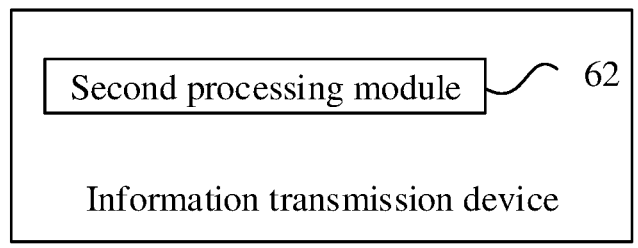

FIG. 6

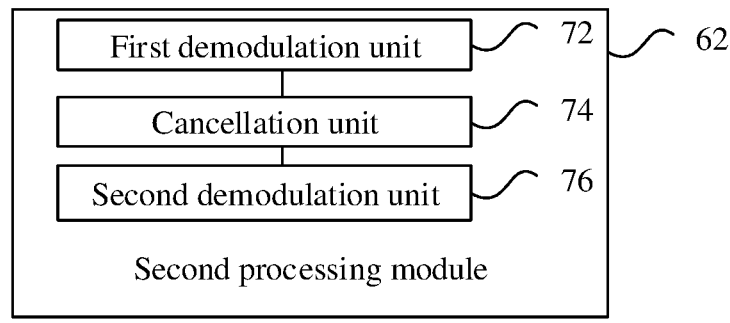

FIG. 7

INFORMATION TRANSMISSION METHOD AND DEVICE, AND COMPUTER STORAGE MEDIUM

TECHNICAL FIELD

The disclosure relates to the field of communication, and particularly to an information transmission method and device and a computer storage medium.

BACKGROUND

According to radio access manners, multi-user information transmission technologies may be divided into Orthogonal Multiple Access (OMA) and nonorthogonal multiple access. In the OMA technology, multiple users use mutually orthogonal physical resources for information transmission respectively. For example, Time Division Multiple Access (TDMA), orthogonal Code Division Multiple Access (CDMA) and Orthogonal Frequency Division Multiple Access (OFDMA) all belong to the scope of the OMA technology.

In the OMA technology, a transmitter transmits information of multiple users over mutually orthogonal channels respectively, so there is no interference between the information of each user during demodulation and the information of the users may further be separated easily. Correspondingly, in the nonorthogonal multiple access technology, multiple users may transmit information on the same physical resource. Therefore, there exists interference between the information of the multiple users during demodulation and a receiver needs to adopt a multi-user detection technology, for example, a Successive Interference Cancellation (SIC) technology, to suppress or cancel the interference among the multiple users and extract the information of each user. Brief descriptions will be made below with an SIC process for two users as an example and then an SIC process for multiple users may be popularized easily. At first, information of user A is demodulated and decoded (the information of A is demodulated and decoded with interference from user B). Then, information of the user B is demodulated after the information of A is required to be subtracted (reconstruction may be required). In such a manner, performance may be improved greatly due to no interference on the information of the user B.

In a related art, combining nonorthogonal multiple access with the SIC technology may achieve the multi-user information capacity and may also ensure high fairness between throughputs of an edge user and a center user. For a future wide-area coverage and high-capacity scenario, the nonorthogonal multiple access technology is an enhancement for a present Long Term Evolution (LTE) communication system.

Downlink Control Information (DCI) is necessary for ensuring normal running of a practical wireless cellular communication system (for example, LTE Release 10). The DCI includes a downlink scheduling allocation, an uplink scheduling request and a power control command for User Equipment (UE). A base station usually sends DCI in a fixed format to UE through a Physical Downlink Control Channel (PDCCH), processes information according to the DCI in the fixed format and sends the processed information to the UE through a Physical Downlink Shared Channel (PDSCH). The fixed format of the DCI includes format 0, format 1, format 1A, format 1B, format 1C, format 1D, format 2, format 2A, format 2B, format 2C, format 3, format 3A and format 4. The UE demodulates a signal according to the received DCI. From the above comprehension to the nonorthogonal multiple access technology, it can be known that the key is that the base station knows how to perform superposition processing on information of user A and information of a user B and that the user B knows how to well cancel interference from the user A during demodulation.

However, DCI recognizable for a base station of a present practical communication system (for example, an LTE system) may not be adopted to indicate two users' data to perform superposition transmission, that is, the base station does not know how to perform superposition processing on the information of the user A and the information of the user B.

Correspondingly, DCI recognizable for UE of the present practical communication system (for example, the LTE system) may also not be adopted to indicate a user to perform SIC, that is, the user B does not know about related information of the user A or erases the information of the user A.

There is yet no effective solution to solve the problems in the related art that DCI recognizable for a base station using a nonorthogonal multiple access technology may not be adopted to indicate two users' data to perform superposition transmission and DCI recognizable for the UE using the nonorthogonal multiple access technology may not be adopted to indicate a user to perform SIC.

SUMMARY

Embodiments of the disclosure provide an information transmission method and device and a computer storage medium, so as to at least solve the problems in the related art that DCI recognizable for a base station using a nonorthogonal multiple access technology cannot be adopted to instruct two users' data to perform superposition transmission and DCI recognizable for the UE using the nonorthogonal multiple access technology cannot be adopted to instruct a user to perform SIC.

According to an embodiment of the disclosure, an information transmission method is provided, which may include that: signal indication information is sent to a receiver and a signal is transmitted according to the signal indication information, the signal indication information including at least one of: a transmission mode, interference layer information, power ratio indication information, precoding or port information and Physical Resource Block (PRB) indication information.

In the embodiment of the disclosure, the signal indication information may be transmitted through DCI and the DCI may include at least one of the following manners: manner 1: additional x bits and DCI in a control information format Y, the additional x bits being configured to indicate the signal indication information, x being a positive integer and Y being a format Identifier and being a number or a combination of a number and a letter; manner 2: the additional x bits and DCI in a redefined control information format Y, the additional x bits and one or more fields of the DCI in the redefined control information format Y being configured to represent the signal indication information; and manner 3: the DCI in a redefined control information format Y, one or more fields of the DCI in the redefined control information format Y being configured to represent the signal indication information.

In the embodiment of the disclosure, for the manner 1, indication of the signal indication information by the additional x bits may include at least one of: independent indication of one piece of the signal indication information by n bits, n being an integer of 1~x, or joint indication of two or more than two pieces of the signal indication information by n bits, n being an integer of 1~x.

In the embodiment of the disclosure, when indication of the signal indication information by the additional x bits refers to the independent indication of one piece of the signal indication information by n bits, the one piece of the signal indication information may include the transmission mode, the interference layer information, the power ratio indication information, the precoding or port information and the PRB indication information.

In the embodiment of the disclosure, when the indication of the signal indication information by the additional x bits refers to the joint indication of two or more than two pieces of the signal indication information by n bits, at least two of the transmission mode, the interference layer information and the power ratio indication information may be jointly indicated.

In the embodiment of the disclosure, the method may further include that: a preconfigured set is selected through n-bit signaling, the preconfigured set including the signal indication information configured according to the manner 1.

In the embodiment of the disclosure, the manner 2 may include at least one of: independent indication of one piece of the signal indication information by n bits, n being an integer of 1~x, and indication of one or more pieces of the signal indication information by one or more fields of the DCI in the redefined control information format Y; joint indication of two or more than two pieces of the signal indication information by n bits, n being an integer of 1~x, and indication of one or more pieces of the signal indication information by one or more fields of the DCI in the redefined control information format Y; and indication of multiple pieces of the signal indication information by a combination of n bits and one or more fields of the DCI in the redefined control information format Y.

In the embodiment of the disclosure, the method may include that: 1 bit is adopted to independently indicate the transmission mode and one or more fields of the DCI in the redefined control information format Y are adopted to indicate the interference layer information, the power ratio indication information, the precoding or port information and the PRB indication information.

In the embodiment of the disclosure, 1 bit may be adopted to independently indicate the transmission mode, and a precoding information field of DCI in a redefined control information format 2 may be adopted to indicate the power ratio indication information; or, 1 bit may be adopted to independently indicate the transmission mode, and a port, a layer number and a scrambling code joint field of DCI in a redefined control information format 2C may be adopted to indicate the interference layer information.

In the embodiment of the disclosure, the method may include that: n bits are adopted to jointly indicate the transmission mode and the power ratio indication information, n being an integer of 1~x, and one or more fields of the DCI in the redefined control information format Y are adopted to indicate one or more pieces of the signal indication information.

In the embodiment of the disclosure, the method may include that: a preconfigured set is selected through n-bit signaling, the preconfigured set including the signal indication information configured according to the manner 2.

In the embodiment of the disclosure, the transmission mode may include a first transmission mode and a second transmission mode; wherein the first transmission mode may refer to bit stream transmission of different nodes and the second transmission mode may refer to bit stream transmission of the same node; or, the first transmission mode may refer to multi-user superposition transmission and the second transmission mode may refer to diversity transmission, or single-port transmission or multi-port transmission.

In the embodiment of the disclosure, when the transmission mode is the second transmission mode, new x bits may be configured to enhance existing DCI and provide additional indication information.

In the embodiment of the disclosure, when the transmission mode is the second transmission mode, the new x bits may be configured to indicate a PRB for which a transmission mode is the first transmission mode and a PRB for which a transmission mode is the second transmission mode.

In the embodiment of the disclosure, the interference layer information may include: existence of interference from a bit stream of other node in a first layer; or existence of the interference from a bit stream of other node in a second layer; or existence of the interference from a bit stream of other node in a first layer and a second layer.

In the embodiment of the disclosure, the operation that the signal indication information is sent to the receiver and the signal is transmitted according to the signal indication information may include that: specified signaling is configured and, when the specified signaling is enabled, at least one of the following operations is executed: two groups of bit data streams are processed according to a Gray conversion table to obtain two groups of new bit data streams, the two groups of new bit data streams are combined and combined bit stream data is sent to the receiver, wherein a synthesis modulation constellation corresponding to the combined bit stream data is a Gray mapping constellation; or it is indicated that the receiver is incapable of making a hypothesis about whether transmitted data of another receiver is multiplexed in a same layer or not.

In the embodiment of the disclosure, the same layer may adopt the same precoding or the same ports, or adopt different precoding or different ports.

In the embodiment of the disclosure, the specified signaling may be configured to indicate a space layer where the transmitted data of the another receiver is multiplexed.

In the embodiment of the disclosure, responsive to that the receiver is incapable of making a hypothesis about whether the transmitted data of the another receiver is multiplexed in the layer or not, the receiver may be indicated to detect the layer.

In the embodiment of the disclosure, before the operation that the signal indication information is sent to the receiver and the signal is transmitted according to the signal indication information, the method may further include that: a set including one or more types of signal indication information is preconfigured, the set being configured to send the signal indication information to the receiver.

In the embodiment of the disclosure, after the set is configured through high-layer signaling, whether to start the configuration or not may be determined by DCI signaling.

In the embodiment of the disclosure, the power ratio indication information may include a power relationship of multiple groups of bit streams, wherein the power relationship of the multiple groups of bit streams is $\alpha=Pi/(Pi+Pj)$, $\alpha$ is a power ratio of the bit stream, Pi is power of a bit stream in an ith group, Pj is power of a bit stream in a jth group, and i and j are positive integers.

In the embodiment of the disclosure, the PRB indication information may include at least one of that: a first transmission mode is adopted for all scheduled PRBs or the first transmission mode is adopted for part of scheduled PRBs, the first transmission mode referring to bit stream transmission of different nodes or the first transmission mode referring to multi-user superposition transmission; scheduled PRBs are paired with only one receiver or scheduled PRBs are paired with multiple receivers; the first transmission mode is adopted for all the scheduled PRBs and the scheduled PRBs are paired with only one UE; or the first transmission mode is adopted for all the scheduled PRBs and the scheduled PRBs are paired with multiple UEs; or the first transmission mode is adopted for part of scheduled PRBs and the scheduled PRBs are paired with one UE; or the first transmission mode is adopted for part of scheduled PRBs and the scheduled PRBs are paired with multiple UEs.

In the embodiment of the disclosure, the precoding or port information may include that precoding or port is same and that precoding or ports are different, wherein different ports may include that ports are different but the port quantity is same, and that ports are different and port quantity is different.

In the embodiment of the disclosure, responsive to that different precoding or ports and different port numbers are configured, the precoding or the ports may be determined according to a port of a target receiver; responsive to that different precoding or ports and the same port quantity are configured, at least one of the following configurations may be made: responsive to that there is one port, at least one of the following conditions is included: a port of target UE is 7 and a port of interference UE is 8; the port of the target UE is 8 and the port of the interference UE is 7; or the port of the target UE is 7 and the port of the interference UE is 9; the port of the target UE is 8 and the port of the interference UE is 10; the port of the target UE is 7 and the port of the interference UE is 10; the port of the target UE is 8 and the port of the interference UE is 9; responsive to that there are two ports, at least one of the following conditions is included: ports of the target UE are 7 and 8 and ports of the interference UE are 7 and 8, a scrambling code identifier of the target UE being different from a scrambling code identifier of the interference UE; or the ports of the target UE are 7 and 8 and ports of the interference UE are 9 and 10; the ports of the target UE are 7 and 9 and the ports of the interference UE are 8 and 10; and the ports of the target UE are 8 and 10 and the ports of the interference UE are 7 and 9.

In the embodiment of the disclosure, the port information may include port information of one or two or three paired UEs.

The port information may be implied in a target port.

In the embodiment of the disclosure, the port information may include that: responsive to that the target UE has a single port, a scrambling code identifier nscid of the target UE and nscid of paired UE are predefined values; and responsive to that the target UE has two ports, the nscid of the target UE is dynamically indicated through signaling and the nscid of the paired UE is determined according to the nscid of the target UE.

In the embodiment of the disclosure, the port information may include that: responsive to that the target UE has a single port or two ports, the nscid of the target UE and the nscid of the paired UE are 0, or 1 or configured through high-layer signaling.

In the embodiment of the disclosure, the port information may include: existence of an interference signal at a candidate port or not, and a modulation order for the interference signal at the candidate port, wherein the candidate port is determined according to the port of the target UE.

In the embodiments of the disclosure, the method may further include the following operations:

a candidate port set of the paired UE is determined according to the port of the target UE and a port of the paired UE is indicated in the candidate set according to a bit field about whether the interference signal exists or not;

or, a candidate port set of the paired UE is determined according to the port of the target UE and a port of the paired UE is indicated in the candidate set according to a bit field about the modulation order for the interference signal;

a candidate port set of the paired UE is determined according to the port of the target UE and a port of the paired UE is indicated in the candidate set according to a bit field about whether the interference signal exists or not and a bit field about the modulation order for the interference signal;

or, a candidate port set is predefined and the port of the paired UE is indicated in the predefined candidate set according to a bit field about whether the interference signal exists or not or a bit field about the modulation order for the interference signal.

In the embodiment of the disclosure, the number of resources corresponding to the transmitted signal may be less than or equal to x1 Resource Blocks (RBs), or the number of the resources corresponding to the transmitted signal may be less than or equal to x2 Resource Block Groups (RBGs), or the number of the resources corresponding to the transmitted signal may be less than or equal to x3 discontinuous regions, x1, x2 and x3 being positive integers.

In the embodiment of the disclosure, the port information corresponding to the transmitted signal may be 9 and/or 10.

According to another embodiment of the disclosure, an information transmission method is also provided, which may include that: signal indication information sent by a transmitter is received and a target signal is demodulated according to the signal indication information, the signal indication information including at least one of: a transmission mode, interference layer information, power ratio indication information, precoding or port information and PRB indication information.

In the embodiment of the disclosure, the operation that the target signal is demodulated according to the signal indication information may include that: an interference signal is demodulated according to the received signal indication information; the interference signal is canceled; and the target signal is demodulated.

According to another embodiment of the disclosure, an information transmission device is also provided, which may include: a first processing module, configured to send signal indication information to a receiver and transmit a signal according to the signal indication information, wherein the signal indication information includes at least one of: a transmission mode, interference layer information, power ratio indication information, precoding or port information and PRB indication information.

In the embodiment of the disclosure, the first processing module may include: a processing unit, configured to configure specified signaling and, when the specified signaling is enabled, execute at least one of the following operations: processing two groups of bit data streams according to a Gray conversion table to obtain two groups of new bit data streams, combining the two groups of new bit data streams and sending combined bit stream data to the receiver, a synthesis modulation constellation corresponding to the combined bit stream data being a Gray mapping constellation; or indicating the receiver to be incapable of making a hypothesis about whether transmitted data of another receiver is multiplexed in the same layer or not.

In the embodiment of the disclosure, the device may further include: a configuration module, configured to, before the signal indication information is sent to the receiver and the signal is transmitted according to the signal indication information, preconfigure a set including one or more types of signal indication information, the set being configured to send the signal indication information to the receiver.

According to another embodiment of the disclosure, an information transmission device is also provided, which may include: a second processing module, configured to receive signal indication information from a transmitter and demodulate a target signal according to the signal indication information, the signal indication information including at least one of: a transmission mode, interference layer information, power ratio indication information, precoding or port information and PRB indication information.

In the embodiment of the disclosure, the second processing module may include: a first demodulation unit, configured to obtain an interference signal by demodulation according to the received signal indication information; a cancellation unit, configured to cancel the interference signal; and a second demodulation unit, configured to obtain the target signal by demodulation.

According to another embodiment of the disclosure, a computer storage medium is further provided. The computer storage medium may be configured to store a program code for executing the following operation:

sending signal indication information to a receiver and transmitting a signal according to the signal indication information, the signal indication information including at least one of: a transmission mode, interference layer information, power ratio indication information, precoding or port information and PRB indication information.

According to the disclosure, signal indication information is sent to a receiver and a signal is transmitted according to the signal indication information, the signal indication information including at least one of: a transmission mode, interference layer information, power ratio indication information, precoding or port information and PRB indication information. The problems in the related art that DCI recognizable for a base station using a nonorthogonal multiple access technology may not be adopted to instruct two users' data to perform superposition transmission and DCI recognizable for the UE using the nonorthogonal multiple access technology may not be adopted to instruct a user to perform SIC are further solved.

BRIEF DESCRIPTION OF DRAWINGS

The drawings described herein are adopted to provide a further understanding to the disclosure and form a part of the application. Schematic embodiments of the disclosure and descriptions thereof are adopted to explain the disclosure and not intended to form improper limits to the disclosure. In the drawings:

FIG. 1 is a flowchart of an information transmission method according to an embodiment of the disclosure;

FIG. 2 is a structure block diagram of an information transmission device according to an embodiment of the disclosure;

FIG. 3 is structure block diagram 1 of an information transmission device according to an embodiment of the disclosure;

FIG. 4 is structure block diagram 2 of an information transmission device according to an embodiment of the disclosure;

FIG. 5 is a flowchart of another information transmission method according to an embodiment of the disclosure;

FIG. 6 is structure block diagram 3 of an information transmission device according to an embodiment of the disclosure; and FIG. 7 is structure block diagram 4 of an information transmission device according to an embodiment of the disclosure.

DETAILED DESCRIPTION

The disclosure will be described below with reference to the drawings and in combination with the embodiments in detail. It is to be noted that the embodiments in the application and characteristics in the embodiments may be combined without conflicts.

It is to be noted that terms "first", "second" and the like in the specification, claims and drawings of the disclosure are adopted not to describe a specific sequence or order but to distinguish similar objects.

Embodiment 1

The embodiment provides an information transmission method. FIG. 1 is a flowchart of an information transmission method according to an embodiment of the disclosure. As shown in FIG. 1, the flow includes the following operations.

In S102, signal indication information is sent to a receiver and a signal is transmitted according to the signal indication information, the signal indication information including at least one of: a transmission mode, interference layer information, power ratio indication information, precoding or port information and Physics Resource Block (PRB) indication information.

In the embodiment of the disclosure, an execution body in this operation may be, but not limited to, a base station (transmitter) and the like.

In the embodiment of the disclosure, an application scenario of the information transmission method includes, but not limited to, a scenario under which nonorthogonal superposition transmission is supported. In the application scenario, the base station (transmitter) sends the signal indication information to UE (the receiver) and transmits the signal according to the signal indication information. The signal indication information includes at least one of: the transmission mode, the interference layer information, the power ratio indication information, the precoding or port information and the PRB indication information. By the embodiment, the problems in the related art that DCI recognizable for a base station using a nonorthogonal multiple access technology may not be adopted to indicate two users' data to perform superposition transmission and DCI recognizable for the UE using the nonorthogonal multiple access technology may not be adopted to indicate a user to perform SIC are solved.

In an optional implementation mode, the signal indication information is transmitted through DCI. The DCI includes at least one of the following manners.

Manner 1: additional x bits and DCI in a control information format Y, the additional x bits being configured to indicate the signal indication information, x is a positive integer and Y being a format identifier which is a number or a combination of a number and a letter;

Manner 2: additional x bits and DCI in a redefined control information format Y, the additional x bits and one or more fields of the DCI in the redefined control information format Y being configured to represent the signal indication information; and Manner 3: DCI in a redefined control information format Y, one or more fields of the DCI in the redefined control information format Y being configured to represent the signal indication information.

In the optional implementation mode, the DCI is formed in a reconstruction or redefinition manner, so that the DCI recognizable for the UE using the nonorthogonal multiple access technology may be adopted to indicate two users' data to perform superposition transmission and the DCI recognizable for the UE using the nonorthogonal multiple access technology may be adopted to indicate a user to perform SIC.

For the manner 1, indication of the signal indication information by the additional x bits includes at least one of: independent indication of one piece of the signal indication information by n bits, n being an integer of 1-x, or joint indication of two or more than two pieces of the signal indication information by n bits, n being an integer of 1-x.

In the embodiment of the disclosure, when indication of the signal indication information by the additional x bits refers to independent indication of one piece of the signal indication information by n bits, the one piece of the signal indication information includes the transmission mode, the interference layer information, the power ratio indication information, the precoding or port information and the PRB indication information.

In the embodiment of the disclosure, when indication of the signal indication information by the additional x bits refers to joint indication of two or more than two pieces of the signal indication information by n bits, at least two of the transmission mode, the interference layer information and the power ratio indication information are jointly indicated.

In an optional implementation mode, the information transmission method may further include that: a preconfigured set is selected through n-bit signaling, the preconfigured set including the signal indication information configured according to the manner 1.

The manner 2 includes at least one of: independent indication of one piece of the signal indication information by n bits, n being an integer of 1-x, and indication of one or more pieces of the signal indication information by one or more fields of the DCI in the redefined control information format Y; joint indication of two or more than two pieces of the signal indication information by n bits, n being an integer of 1-x, and indication of one or more pieces of the signal indication information by one or more fields of the DCI in the redefined control information format Y; and indication of multiple pieces of the signal indication information by a combination of n bits with one or more fields of the DCI in the redefined control information format Y.

In the embodiment of the disclosure, in the manner 2, 1 bit may be adopted to independently indicate the transmission mode and one or more fields of the DCI in the redefined control information format Y may be adopted to indicate the interference layer information, the power ratio indication information, the precoding or port information, and the PRB indication information.

In the embodiment of the disclosure, in the manner 2, 1 bit may be adopted to independently indicate the transmission mode, and a precoding information field of DCI in a redefined control information format 2 is adopted to indicate the power ratio indication information; or, 1 bit is adopted to independently indicate the transmission mode, and a port, the number of layers and the scrambling code joint field of DCI in a redefined control information format 2C is adopted to indicate the interference layer information.

In an optional implementation mode, n bits may be adopted to jointly indicate the transmission mode and the power ratio indication information, n being an integer of 1-x; and one or more fields of the DCI in the redefined control information format Y are adopted to indicate one or more pieces of the signal indication information.

In the embodiment of the disclosure, the information transmission method may include that: the preconfigured set is selected through the n-bit signaling, the preconfigured set including the signal indication information configured according to the manner 2.

In an optional implementation mode, the transmission mode involved in S102 includes a first transmission mode and a second transmission mode. The first transmission mode refers to bit stream transmission of different nodes and the second transmission mode refers to bit stream transmission of the same node. Or, the first transmission mode refers to multi-user superposition transmission and the second transmission mode refers to diversity transmission, or single-port transmission or multi-port transmission.

In the embodiment of the disclosure, when the transmission mode is the second transmission mode, new x bits are configured to enhance existing DCI and provide additional indication information. When the transmission mode is the second transmission mode, the new x bits are configured to indicate a PRB for which a transmission mode is the first transmission mode and a PRB for which a transmission mode is the second transmission mode.

In an optional implementation mode, the interference layer information involved in S102 includes: existence of interference from a bit stream of another node in a first layer; or existence of interference from a bit stream of another node in a second layer; or existence of interference from a bit stream of another node in the first layer and the second layer.

In the embodiment of the disclosure, the operation in S102 that the signal indication information is sent to the receiver and the signal is transmitted according to the signal indication information includes:

In S11, specified signaling is configured and, when the specified signaling is enabled, at least one of the following operations is executed:

two groups of bit data streams are processed according to a Gray conversion table to obtain two groups of new bit data streams; the two groups of new bit data streams are combined and the combined bit stream data is sent to the receiver, a synthesis modulation constellation corresponding to the combined bit stream data being a Gray mapping constellation; or it is indicated that the receiver cannot make a hypothesis about whether transmitted data of another receiver is multiplexed in the same layer or not.

The same layer involved in S11 includes the same layer adopting the same precoding or the same ports, or the same layer adopting different precoding or different ports. The specified signaling is configured to indicate a space layer where the transmitted data of the other receiver is multiplexed.

In an optional implementation mode, when the receiver cannot make a hypothesis about whether the transmitted data of the other receiver is multiplexed in the layer or not, the receiver is instructed to detect the layer.

In the embodiment of the disclosure, before S102, the method further includes that: a set including one or more types of signal indication information is preconfigured, the set being configured to send the signal indication information to the receiver.

In the embodiment of the disclosure, after the set is configured through high-layer signaling, whether to start the configuration or not is determined by DCI signaling.

In an optional implementation mode, the power ratio indication information involved in S102 includes a power relationship of multiple groups of bit streams, the power relationship of the multiple groups of bit streams being $\alpha=Pi/(Pi+Pj)$, $\alpha$ being a power ratio of the bit stream, Pi being power of a bit stream in an ith group, Pj being power of a bit stream in a jth group, and i and j being positive integers.

The PRB indication information involved in S102 includes at least one of that: the first transmission mode is adopted for all scheduled PRBs or the first transmission mode is adopted for part of scheduled PRBs, the first transmission mode referring to bit stream transmission of different nodes or the first transmission mode referring to multi-user superposition transmission; the scheduled PRBs are paired with only one receiver or the scheduled PRBs are paired with multiple receivers; the first transmission mode is adopted for all the scheduled PRBs and the scheduled PRBs are paired with only one UE; or the first transmission mode is adopted for all the scheduled PRBs and the scheduled PRBs are paired with multiple UEs; or the first transmission mode is adopted for part of scheduled PRBs and the scheduled PRBs are paired with one UE; or the first transmission mode is adopted for part of scheduled PRBs and the scheduled PRBs are paired with multiple UEs.

The precoding or port information involved in S102 includes that: precoding or ports are the same, and precoding or ports are different; different ports includes that: ports are different but the number of the ports is same, and that ports are different and the number of the ports is different.

In the embodiment of the disclosure, when different precoding or ports and different port quantity are configured, precoding or the ports are determined according to a port of a target receiver; when different precoding or ports and the same port quantity are configured, at least one of the following configurations is made: responsive to that there is one port, at least one of the following conditions is included: a port of target UE is 7 and a port of interference UE is 8; the port of the target UE is 8 and the port of the interference UE is 7; or the port of the target UE is 7 and the port of the interference UE is 9; the port of the target UE is 8 and the port of the interference UE is 10; the port of the target UE is 7 and the port of the interference UE is 10; the port of the target UE is 8 and the port of the interference UE is 9; responsive to that there are two ports, at least one of the following conditions is included: ports of the target UE are 7 and 8 and ports of the interference UE are 7 and 8, a scrambling code identifier of the target UE being different from a scrambling code identifier of the interference UE; or the ports of the target UE are 7 and 8 and ports of the interference UE are 9 and 10; the ports of the target UE are 7 and 9 and the ports of the interference UE are 8 and 10; and the ports of the target UE are 8 and 10 and the ports of the interference UE are 7 and 9.

In the embodiment of the disclosure, the port information includes port information of one or two or three paired UEs.

The port information is implied in a target port.

Here, the paired UE refers to that: when a base station sends a signal to a group of UE and if one UE in the group of UEs is determined as a target UE, the other UEs in the group of UEs are called paired UE of the target UE. For example, the group of UE includes A, B, C and D and, if A is the target UE, B, C and D are all paired UE of A. For the target UE, there may be one or multiple paired UE.

In the embodiment of the disclosure, the port information includes that: responsive to that the target UE has a single port, the scrambling code identifier (nscid) of the target UE and nscid of paired UE are predefined; and responsive to that the target UE has two ports, the nscid of the target UE is dynamically indicated through signaling and the nscid of the paired UE is determined according to the nscid of the target UE.

In the embodiment of the disclosure, the port information includes that: responsive to that the target UE has a single port or two ports, the nscid of the target UE and the nscid of the paired UE are 0, or 1 or configured through high-layer signaling.

In the embodiment of the disclosure, the port information includes: existence of an interference signal at a candidate port or not, and a modulation order for the interference signal at the candidate port, the candidate port being determined according to the port of the target UE.

In the embodiments of the disclosure, the method further includes the following operations:

a candidate port set of the paired UE is determined according to the port of the target UE and a port of the paired UE is indicated in the candidate set according to a bit field about whether the interference signal exists or not;

or, a candidate port set of the paired UE is determined according to the port of the target UE and the port of the paired UE is indicated in the candidate set according to a bit field about the modulation order for the interference signal;

a candidate port set of the paired UE is determined according to the port of the target UE and the port of the paired UE is indicated in the candidate set according to the bit field about whether the interference signal exists or not and the bit field about the modulation order for the interference signal;

or, a candidate port set is predefined and the port of the paired UE is indicated in the predefined candidate set according to the bit field about whether the interference signal exists or not or the bit field about the modulation order for the interference signal.

In the embodiment of the disclosure, the number of resources corresponding to the transmitted signal involved in S102 is less than or equal to x1 Resource Blocks (RBs), or the number of the resources corresponding to the transmitted signal is less than or equal to x2 Resource Block Groups (RBGs), or the number of the resources corresponding to the transmitted signal is less than or equal to x3 discontinuous regions, x1, x2 and x3 being positive integers.

In the embodiment of the disclosure, the port information corresponding to the transmitted signal is 9 and/or 10.

The embodiment will be described below with specific examples.

Optional Example 1

Solution 1

The transmission mode includes the first transmission mode and the second transmission mode. Furthermore, the first transmission mode is a MUST mode and the second transmission mode is a non-MUST mode. 1 bit is adopted to indicate the transmission mode, as shown in Table 1.

TABLE 1

| MUST switch value | MUST (enabled) |
|---|---|
| 0 | on |
| 1 | off |

Solution 2: the transmission mode and the interference layer information are jointly indicated. As shown in Table 2, the first row means that a system works in the non-MUST mode, the second row means that the system works in the MUST mode and interference to the receiver exists in the first layer, the third row means that the system works in the MUST mode and the interference to the receiver exists in the second layer and the fourth row means that the system works in the MUST mode and the interference to the receiver exists in the first layer and the second layer. The other four states may be configured to indicate other information.

TABLE 2

| Value | MUST (enabled) | Interference layer |
|---|---|---|
| 0 | off | — |
| 1 | on | 1 |
| 2 | on | 2 |
| 3 | on | 1 and 2 |
| 4 | Reserved | Reserved |
| 5 | Reserved | Reserved |
| 6 | Reserved | Reserved |
| 7 | Reserved | Reserved |

Optional Example 2

The interference layer information includes interference layer indication information, including at least one of: a first layer, a second layer, and the first layer and the second layer.

The interference layer indication information and layer information of the target UE are jointly indicated. When a DCI format is DCI 2C, an "antenna port, scrambling code identifier and layer number" joint field of the target UE is redefined to indicate the interference layer information as well as the antenna port, the scrambling code identifier and the layer number of the target UE. When the MUST mode is adopted, the interference layer indication information in the redefined field is valid and, when the MUST mode is not adopted, the indication information in the redefined field is invalid.

As shown in Table 3, the interference layer information are indicated jointly with the antenna port, the scrambling code identifier and the layer number of the target UE.

An interference layer is the same as a space layer of the target UE when the MUST mode is adopted and the layer number of the target UE is 1.

"2 layers, ports 7-8, 1 and 2" represents that the interference layer is the first layer and the second layer, the layer number is 2 and the ports are 7 and 8 when the MUST mode is adopted, the layer number of the target UE is 2, a single codeword is enabled and value=4.

"2 layers, ports 7-11, 2" represents that the interference layer is the second layer, the layer number is 2 and the ports are 7-11 when the MUST mode is adopted, the layer number of the target UE is 2, multi-codeword is enabled and value=4.

TABLE 3

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7, nSCID = 0 | 0 | 2 layers, ports 7-8, nSCID = 0, 1 and 2 |
| 1 | 1 layer, port 7, nSCID = 1 | 1 | 2 layers, ports 7, nSCID = 1, 1 and 2 |
| 2 | 1 layer, port 8, nSCID = 0 | 2 | 2 layers, ports 7-9, 1 |
| 3 | 1 layer, port 8, nSCID = 1 | 3 | 2 layers, ports 7-10, 1 |
| 4 | 2 layers, ports 7-8, 1 and 2 | 4 | 2 layers, ports 7-11, 2 |
| 5 | 2 layers, ports 7-9, 1 | 5 | 2 layers, ports 7-12, 2 |
| 6 | 2 layers, ports 7-10, 2 | 6 | 7 layers, ports 7-13 |
| 7 | Reserved | 7 | 8 layers, ports 7-14 |

Optional Example 3

Solution 1

2 bits are adopted to indicate the power ratio indication information. As shown in Table 4, the first row means, for example, in a space layer, that a signal power ratio of the interference UE is 0.750.

TABLE 4

| value | power ratio value |
|---|---|
| 0 | 0.750 |
| 1 | 0.800 |
| 2 | 0.875 |
| 3 | 0.900 |

Solution 2: the power ratio indication information and at least one of the transmission mode and the interference layer information are jointly indicated. As shown in Table 5, the power ratio indication information and the transmission mode are jointly indicated. The first row indicates that the system works in the non-MUST mode. Or, MUST enabling information may be implicitly indicated but may be reflected through power ratio value. For example, when power ratio value is 1, it is indicated that the transmission mode is a non-MUST manner

TABLE 5

| value | MUST (enabled) | power ratio value |
|---|---|---|
| 0 | off | — |
| 1 | on | 0.800 |
| 2 | on | 0.875 |
| 3 | on | 0.900 |

Solution 3: the power ratio indication information and at least one of the transmission mode and the interference layer information are jointly indicated. As shown in Table 6, the power ratio indication information and the interference layer information are jointly indicated.

TABLE 6

| value | Interference layer | power ratio value |
|---|---|---|
| 0 | 1 | 0.800 |
| 1 | 2 | 0.800 |

TABLE 6-continued

| value | Interference layer | power ratio value |
|---|---|---|
| 2 | 1 and 2 | 0.800 |
| 3 | 1 | 0.875 |
| 4 | 2 | 0.875 |
| 5 | 1 and 2 | 0.875 |
| 6 | Reserved | Reserved |
| 7 | Reserved | Reserved |

Optional Example 4

Three first transmission modes and one second transmission mode are predefined. A configuration set is dynamically selected through 2-bit signaling. The configuration set includes the signal indication information. The configuration set is a Radio Resource Control (RRC) configuration.

For example, 2 bits are added in all the DCI.
00 represents a conventional transmission mode.
01 represents a first MUST transmission mode.
10 represents a second MUST transmission mode.
11 represents a third MUST transmission mode.

Furthermore, in case of the first, second and third MUST modes, the signal indication information corresponding to the MUST modes is an RRC configuration set. For example, after the first MUST transmission mode is selected, the RRC configuration set may be obtained, thereby obtaining the required signal indication information.

Optional Example 5

Port information of the target UE and the paired UE is jointly indicated. There may be one or two or three paired UE. In a case that the DCI format is DCI 2C and the system works in the MUST mode, as shown in Table 7-1, 7-2 and 7-3, when a single-codeword flow is enabled, antenna ports and scrambling code identifiers of one target UE and at most three paired UEs are jointly indicated. The antenna ports and scrambling code identifiers of the paired UE are uniquely and correspondingly obtained according to the antenna port and scrambling code identifier of the target UE. For each of paired UEs, 2 bits are adopted to indicate existence of interference and modulation order number information.

When the port of the target UE is 7, the candidate port set of the paired UE is {8,11,13}.
When the port of the target UE is 8, the candidate port set of the paired UE is {7,11,13}.
When the port of the target UE is 11, the candidate port set of the paired UE is {7,8,13}.
When the port of the target UE is 13, the candidate port set of the paired UE is {7,8,11}.
When the port of the target UE is 7,8, the candidate port set of the paired UE is {11,13}.
When the port of the target UE is 11,13, the candidate port set of the paired UE is {7,8}.
NO limit is set for the sequence of the ports in the candidate port set.

The port of the paired UE (the port of the interference UE) is indicated in the candidate ports according to the bit field about whether the interference exists or not and/or the bit field about the modulation order for the interference signal.

In case of a single port, the nscid is fixedly 0 or 1 or configured through a higher layer. In case of two ports, the nscid is dynamically indicated.

TABLE 7-1

Single-Codeword Flow Enabled Demodulation Reference Signal (DMRS) Port Information One Codeword:
Codeword 0 enabled,
Codeword 1 disabled

| Value | Message for Target UE | Message for first co-scheduled UE | Message for second co-scheduled UE | Message for third co-scheduled UE |
|---|---|---|---|---|
| 0 | port 7 | port 8 | port 11 | port 13 |
| 1 | port 8 | port 7 | port 11 | port 13 |
| 2 | port 11 | port 7 | port 8 | port 13 |
| 3 | port 13 | port 7 | port 8 | port 11 |
| 4 | ports 7-8, nscid = 0 | port 11 | port 13 | — |
| 5 | ports 7-8, nscid = 1 | port 11 | port 13 | — |
| 6 | ports 11,13, nscid = 0 | port 7 | port 8 | — |
| 7 | ports 11,13, nscid = 1 | port 7 | port 8 | — |

TABLE 7-2

Single-Codeword Flow Enabled DMRS Port Information

One Codeword:
Codeword 0 enabled,
Codeword 1 disabled

| Value | Message for Target UE | Message for first co-scheduled UE | Message for second co-scheduled UE | Message for third co-scheduled UE |
|---|---|---|---|---|
| 0 | port 7 | port 8 | port 11 | port 13 |
| 1 | port 8 | port 11 | port 13 | port 7 |
| 2 | port 11 | port 13 | port 7 | port 8 |
| 3 | port 13 | port 7 | port 8 | port 11 |
| 4 | ports 7-8, nscid = 0 | port 11 | port 13 | — |
| 5 | ports 7-8, nscid = 1 | port 11 | port 13 | — |
| 6 | ports 11, 13, nscid = 0 | port 7 | port 8 | — |
| 7 | ports 11, 13, nscid = 1 | port 7 | port 8 | — |

TABLE 7-3

Single-Codeword Flow Enabled DMRS Port Information

One Codeword:
Codeword 0 enabled,
Codeword 1 disabled

| Value | Message for Target UE | Message for first co-scheduled UE | Message for second co-scheduled UE | Message for third co-scheduled UE |
|---|---|---|---|---|
| 0 | port 7 | port 8 | port 11 | port 13 |
| 1 | port 8 | port 7 | port 11 | port 13 |
| 2 | port 11 | port 13 | port 7 | port 8 |
| 3 | port 13 | port 11 | port 7 | port 8 |
| 4 | ports 7-8, nscid = 0 | port 11 | port 13 | — |
| 5 | ports 7-8, nscid = 1 | port 11 | port 13 | — |
| 6 | ports 11, 13, nscid = 0 | port 7 | port 8 | — |
| 7 | ports 11, 13, nscid = 1 | port 7 | port 8 | — |

As shown in Table 7-4 and 7-5, in case of double-codeword flow enabled, antenna ports and scrambling code identifiers of one target UE and at most two paired UEs are jointly indicated. The antenna ports and scrambling code identifiers of the paired UE are uniquely and correspondingly obtained according to the antenna port and scrambling code identifier of the target UE. In case of two ports, the nscid is dynamically indicated.

TABLE 7-4

Double-Codeword Flow Enabled DMRS Port Information

Two Codewords:
Codeword 0 enabled,
Codeword 1 enabled

| Value | Message for Target UE | Message for first co-scheduled UE | Message for second co-scheduled UE |
|---|---|---|---|
| 0 | ports 7-8, nscid = 0 | port 11 | port 13 |
| 1 | ports 7-8, nscid = 1 | port 11 | port 13 |
| 2 | ports 11, 13, nscid = 0 | port 7 | port 8 |
| 3 | ports 11, 13, nscid = 1 | port 7 | port 8 |

TABLE 7-5

Double-Codeword Flow Enabled DMRS Port Information

Two Codewords:
Codeword 0 enabled,
Codeword 1 enabled

| Value | Message for Target UE | Message for first co-scheduled UE | Message for second co-scheduled UE |
|---|---|---|---|
| 0 | ports 7-8, nscid = 0 | port 11, nscid = 0 | port 13, nscid = 0 |
| 1 | ports 7-8, nscid = 0 | port 11, nscid = 1 | port 13, nscid = 1 |
| 2 | ports 7-8, nscid = 1 | port 11, nscid = 0 | port 13, nscid = 0 |
| 3 | ports 7-8, nscid = 1 | port 11, nscid = 1 | port 13, nscid = 1 |
| 4 | ports 11, 13, nscid = 0 | port 7, nscid = 0 | port 8, nscid = 0 |
| 5 | ports 11, 13, nscid = 0 | port 7, nscid = 1 | port 8, nscid = 1 |
| 6 | ports 11, 13, nscid = 1 | port 7, nscid = 0 | port 8, nscid = 0 |
| 7 | ports 11, 13, nscid = 1 | port 7, nscid = 1 | port 8, nscid = 1 |

As shown in Table 7-6, 7-7, 7-8, 7-9 and 7-10, in case of single-codeword flow enabled, antenna ports and scrambling code identifiers of one target UE and at most two paired UEs are jointly indicated. The antenna ports and scrambling code identifiers of the paired UE are uniquely mapped and obtained according to the antenna port and scrambling code identifier of the target UE.

When the port of the target UE is 7, the candidate port set of the paired UE is {8,11};

when the port of the target UE is 8, the candidate port set of the paired UE is {7,11};

when the port of the target UE is 11, the candidate port set of the paired UE is {7,8};

when the port of the target UE is 7,8, the candidate port set of the paired UE is {11,13};

when the port of the target UE is 11,13, the candidate port set of the paired UE is {7,8};

any sequence may be adopted for the ports in the candidate port set.

Or, when the port of the target UE is 7, the candidate port set of the paired UE is {8,13};

when the port of the target UE is 8, the candidate port set of the paired UE is {7,13};

when the port of the target UE is 13, the candidate port set of the paired UE is {7,8};

when the port of the target UE is 7,8, the candidate port set of the paired UE is 111,131;

when the port of the target UE is 11,13, the candidate port set of the paired UE is {7,8};

any sequence may be adopted for the ports in the candidate port set.

Or, when the port of the target UE is 7, the candidate port set of the paired UE is {8, 13} or {8,11};

when the port of the target UE is 8, the candidate port set of the paired UE is {7, 13} or {7,11};

when the port of the target UE is 13, the candidate port set of the paired UE is {7,8};

when the port of the target UE is 11, the candidate port set of the paired UE is {7,8};

when the port of the target UE is 7,8, the candidate port set of the paired UE is 111,131;

when the port of the target UE is 11,13, the candidate port set of the paired UE is {7,8};

any sequence may be adopted for the ports in the candidate port set.

The port of the paired UE (the port of the interference UE) is indicated in the candidate ports according to the bit field about whether the interference exists or not and/or the bit field about the modulation order for the interference signal.

In case of a single port or double ports, the nscid is fixedly 0 or 1 or configured through the high-layer signaling.

TABLE 7-6

Single-Codeword Flow Enabled DMRS Port Information

Two Codewords:
Codeword 0 enabled,
Codeword 1 disabled

| Value | Message for Target UE | Message for first co-scheduled UE | Message for second co-scheduled UE |
|---|---|---|---|
| 0 | port 7 | port 8 | port 11 |
| 1 | port 8 | port 7 | port 11 |
| 2 | port 11 | port 7 | port 8 |
| 3 | port 13 | port 7 | port 8 |
| 4 | ports 7-8, nscid = 0 | port 11 | port 13 |
| 5 | ports 11, 13, nscid = 0 | port 7 | port 8 |

TABLE 7-7

Single-Codeword Flow Enabled DMRS Port Information

Two Codewords:
Codeword 0 enabled,
Codeword 1 disabled

| Value | Message for Target UE | Message for first co-scheduled UE | Message for second co-scheduled UE |
|---|---|---|---|
| 0 | port 7 | port 8 | port 11 |
| 1 | port 8 | port 7 | port 11 |
| 2 | port 11 | port 7 | port 8 |
| 3 | ports 7-8 | port 11 | port 13 |
| 4 | ports 11, 13 | port 7 | port 8 |

TABLE 7-8

Single-Codeword Flow Enabled DMRS Port Information

Two Codewords:
Codeword 0 enabled,
Codeword 1 disabled

| Value | Message for Target UE | Message for first co-scheduled UE | Message for second co-scheduled UE |
|---|---|---|---|
| 0 | port 7 | port 8 | port 11 |
| 1 | port 8 | port 7 | port 11 |
| 2 | port 11 | port 7 | port 8 |
| 3 | port 7 | port 8 | port 13 |
| 4 | port 8 | port 7 | port 13 |
| 5 | port 13 | port 7 | port 9 |
| 6 | ports 7-8 | port 11 | port 13 |
| 7 | ports 11, 13 | port 7 | port 8 |

TABLE 7-9

Single-Codeword Flow Enabled DMRS Port Information

Two Codewords:
Codeword 0 enabled,
Codeword 1 disabled

| Value | Message for Target UE | Message for first co-scheduled UE | Message for second co-scheduled UE |
|---|---|---|---|
| 0 | port 7, nscid = 0 | port 8 | port 11 |
| 1 | port 8, nscid = 0 | port 7 | port 11 |
| 2 | port 11, nscid = 0 | port 7 | port 8 |
| 3 | port 7, nscid = 1 | port 8 | port 11 |
| 4 | port 8, nscid = 1 | port 7 | port 11 |
| 5 | port 11, nscid = 1 | port 7 | port 8 |
| 6 | ports 7-8 | port 11 | port 13 |
| 7 | ports 11, 13 | port 7 | port 8 |

TABLE 7-10

Single-Codeword Flow Enabled DMRS Port Information

Two Codewords:
Codeword 0 enabled,
Codeword 1 disabled

| Value | Message for Target UE | Message for first co-scheduled UE | Message for second co-scheduled UE |
|---|---|---|---|
| 0 | port 7 | port 8 | port 11 |
| 1 | port 8 | port 7 | port 11 |
| 2 | port 11 | port 7 | port 8 |
| 3 | ports 7-8, nscid = 0 | port 11 | port 13 |
| 4 | ports 11, 13, nscid = 0 | port 7 | port 8 |
| 5 | ports 7-8, nscid = 1 | port 11 | port 13 |
| 6 | ports 11, 13, nscid = 1 | port 7 | port 8 |

Optional Example 6

When the system works in the MUST mode, a port allocated for proximal UE is 9 and/or 10 and a port allocated for remote UE is 7 and/or 8.

From the above descriptions about the implementation modes, those skilled in the art may clearly know that the method according to the abovementioned embodiments may be implemented in a manner of combining software and a necessary universal hardware platform, and of course, may also be implemented through hardware, but the former is a preferred implementation mode under many circumstances. Based on such an understanding, the technical solutions of the disclosure substantially or the parts making contributions to the conventional art may be embodied in form of software product, and the computer software product is stored in a storage medium (for example, a Read-Only Memory (ROM)/Random Access Memory (RAM), a magnetic disk and an optical disk), including a plurality of instructions configured to enable a computer device (which may be a personal computer, a server, a network device or the like) to execute the method in each embodiment of the disclosure.

Embodiment 2

The embodiment further provides an information transmission device, which is configured to implement the abovementioned embodiments and preferred implementation modes. What has been described will not be elaborated. The term "module", as used below, may be a combination of software and/or hardware capable of realizing a preset function. Although the devices described in the following embodiment are preferably implemented with software, implementation with hardware or a combination of the software and the hardware is also possible and conceivable.

FIG. 2 is a structure block diagram of an information transmission device according to an embodiment of the disclosure. As shown in FIG. 2, the device includes a first processing module 22.

1) The first processing module 22 is configured to send signal indication information to a receiver and transmit a signal according to the signal indication information, the signal indication information including at least one of: a transmission mode, interference layer information, power ratio indication information, precoding or port information and PRB indication information.

In the embodiment of the disclosure, an execution body of the operation may be, but not limited to, a base station (transmitter) and the like.

In the embodiment of the disclosure, an application scenario of the information transmission method includes, but not limited to, a scenario supporting nonorthogonal superposition transmission. In the application scenario, the base station (transmitter) sends the signal indication information to UE (the receiver) and transmits the signal according to the signal indication information. The signal indication information includes at least one of: the transmission mode, the interference layer information, the power ratio indication information, the precoding or port information and the PRB indication information. The embodiment solves the problems in the related art that DCI recognizable for a base station using a nonorthogonal multiple access technology may not be adopted to instruct two users to perform superposition transmission, and DCI recognizable for the base station using the nonorthogonal multiple access technology may not be adopted to indicate a user to perform SIC.

In an optional implementation mode, FIG. 3 is structure block diagram 1 of an information transmission device according to an embodiment of the disclosure. As shown in FIG. 3, the first processing module 22 includes a processing unit 32.

1) The processing unit 32 is configured to configure specified signaling and, when the specified signaling is enabled, execute at least one of the following operations:

processing two groups of bit data streams according to a Gray conversion table to obtain two groups of new bit data streams, combining the two groups of new bit data streams and sending combined bit stream data to the receiver, a synthesis modulation constellation corresponding to the combined bit stream data being a Gray mapping constellation; or indicating the receiver to be incapable of making a hypothesis about whether transmitted data of another receiver is multiplexed in the same layer or not.

In an optional implementation mode, FIG. 4 is structure block diagram 2 of an information transmission device according to an embodiment of the disclosure. As shown in FIG. 4, the device, besides the modules shown in FIG. 2, further includes a configuration module 42.

1) The configuration module 42 is configured to, before the signal indication information is sent to the receiver and the signal is transmitted according to the signal indication information, preconfigure a set including one or more types of signal indication information, the set being configured to send the signal indication information to the receiver.

It is to be noted that each of the above-mentioned modules may be implemented through software or hardware and the latter condition may be implemented in, but not limited to, the following manner all of the modules are located in the same processor or each module freely combined with each other is located in different processors respectively.

Embodiment 3

The embodiment further provides an information transmission method. FIG. 5 is a flowchart of another information transmission method according to an embodiment of the disclosure. As shown in FIG. 5, the flow includes the following operation.

In S502, signal indication information sent by a transmitter is received and a target signal is demodulated according to the signal indication information, the signal indication information including at least one of: a transmission mode, interference layer information, power ratio indication information, precoding or port information, and PRB indication information.

In the embodiment of the disclosure, an execution body of the operation may be, but not limited to, UE (receiver) and the like.

In the embodiment of the disclosure, an application scenario of the information transmission method includes, but not limited to, a scenario supporting nonorthogonal superposition transmission. In the application scenario, the UE (receiver) receives the signal indication information from the transmitter and demodulates the target signal according to the signal indication information. The signal indication information includes at least one of: the transmission mode, the interference layer information, the power ratio indication information, the precoding or port information and the PRB indication information. The embodiment solves the problems in the related art that DCI recognizable for a base station using a nonorthogonal multiple access technology may not be adopted to indicate two users' data to perform superposition transmission and DCI recognizable for the base station using the nonorthogonal multiple access technology may not be adopted to indicate a user to perform SIC.

In an optional implementation mode, the operation that the target signal is demodulated according to the signal indication information includes the following operations.

In S21, an interference signal is obtained by demodulation according to the received signal indication information.

In S22, the interference signal is canceled.

In S23, the target signal is obtained by demodulation.

S21-S23 further solves the problems in the related art that DCI recognizable for a base station using a nonorthogonal multiple access technology may not be adopted to indicate two users' data to perform superposition transmission and DCI recognizable for the base station using the nonorthogonal multiple access technology may not be adopted to indicate a user to perform SIC, and thus achieves target signal demodulation accuracy of the UE.

From the above descriptions about the implementation modes, those skilled in the art may clearly know that the method according to the abovementioned embodiments may be implemented in a manner of combining software and a necessary universal hardware platform, and of course, may also be implemented through hardware, but the former is a preferred implementation mode under many circumstances. Based on such an understanding, the technical solutions of the disclosure substantially or the parts making contributions to the conventional art may be embodied in form of software product, and the computer software product is stored in a storage medium (for example, a ROM/RAM, a magnetic disk and an optical disk), including a plurality of instructions configured to enable a computer device (which may be a personal computer, a server, a network device or the like) to execute the method in each embodiment of the disclosure.

Embodiment 4

The embodiment further provides an information transmission device, which is configured to implement the abovementioned embodiments and preferred implementation modes. What has been described will not be elaborated. The term "module", as used below, may be a combination of software and/or hardware capable of realizing a preset function. Although the devices described in the following embodiment are preferably implemented with software, implementation with hardware or a combination of the software and the hardware is also possible and conceivable.

FIG. 6 is structure block diagram 3 of an information transmission device according to an embodiment of the disclosure. As shown in FIG. 6, the device includes a second processing module 62.

1) The second processing module 62 is configured to receive signal indication information sent by a transmitter and demodulate a target signal according to the signal indication information, the signal indication information including at least one of: a transmission mode, interference layer information, power ratio indication information, precoding or port information and PRB indication information.

In an optional implementation mode, FIG. 7 is structure block diagram 4 of an information transmission device according to an embodiment of the disclosure. As shown in FIG. 7, the second processing module 62 includes:

1) a first demodulation unit 72 configured to obtain an interference signal by demodulation according to the received signal indication information;

2) a cancellation unit 74 configured to cancel the interference signal;

3) the second demodulation unit 76 configured to obtain the target signal by demodulate.

Embodiment 5

The embodiment of the disclosure further provides a computer storage medium. In the embodiment of the disclosure, the storage medium may be configured to store a program code for executing the following operation.

In S1, signal indication information is sent to a receiver and a signal is transmitted according to the signal indication information.

The signal indication information includes at least one of: a transmission mode, interference layer information, power ratio indication information, precoding or port information and PRB indication information.

In the embodiment of the disclosure, the storage medium is further configured to store a program code for executing the following operation.

In S2, signal indication information sent by a transmitter is received and a target signal is demodulated according to the signal indication information, the signal indication information including at least one of: a transmission mode, interference layer information, power ratio indication information, precoding or port information and PRB indication information.

In the embodiment, the storage medium may include, but is not limited to: various media capable of storing program codes such as a U disk, a Read-Only Memory (ROM), a Random Access Memory (RAM), a mobile hard disk, a magnetic disk or an optical disk.

In the embodiment, a processor executes S1 according to the program code stored in the storage medium.

In the embodiment, the processor executes S2 according to the program code stored in the storage medium.

Specific examples in the embodiment may refer to the examples described in the above-mentioned embodiments and optional implementation modes and will not be elaborated in the embodiment.

Apparently, those skilled in the art should know that each module or each operation of the disclosure may be implemented by a universal computing device, and the modules or operations may be concentrated on a single computing device or distributed on a network formed by a plurality of computing devices, and may optionally be implemented by program codes executable for the computing devices, so that the modules or operations may be stored in a storage device for execution with the computing devices, the shown or described operations may be executed in sequences different from those described here in some circumstances, or may form each integrated circuit module respectively, or multiple modules or operations therein may form a single integrated circuit module for implementation. As a consequence, the disclosure is not limited to any specific hardware and software combination.

The above is only the preferred embodiments of the disclosure and not intended to limit the disclosure. For those skilled in the art, the disclosure may have various modifications and variations. Any modifications, equivalent replacements, improvements and the like made within the spirit and principle of the disclosure shall fall within the scope of protection of the disclosure.

INDUSTRIAL APPLICABILITY

According to the technical solutions of the embodiments of the disclosure, the signal indication information is sent to the receiver and the signal is transmitted according to the signal indication information, the signal indication information including at least one of: the transmission mode, the interference layer information, the power ratio indication information, the precoding or port information and the PRB indication information. The problems in the related art that DCI recognizable for a base station using a nonorthogonal multiple access technology may not be adopted to indicate two users' data to perform superposition transmission and DCI recognizable for the UE using the nonorthogonal multiple access technology may not be adopted to indicate a user to perform SIC are further solved.

The invention claimed is:

1. A method for information transmission, comprising:
sending signal indication information to a receiver and transmitting a signal according to the signal indication information, wherein the signal indication information comprises at least one of: a transmission mode, interference layer information, power ratio indication information, precoding information, or port information,
wherein the signal indication information is transmitted through Downlink Control Information (DCI) and the DCI comprises a manner 1: additional x bits and DCI in a control information format Y, wherein the additional x bits are configured to indicate the signal indication information, x is a positive integer and Y is a format identifier which is a number or a combination of a number and a letter;
wherein for the manner 1, indication of the signal indication information by the additional x bits comprises at least one of:
independent indication of each piece of the signal indication information by n bits, n being an integer between 1 and x, or
joint indication of two or more than two pieces of the signal indication information by n bits, n being an integer between 1 and x;
wherein when the indication of the signal indication information by the additional x bits refers to the joint indication of two or more than two pieces of the signal indication information by n bits, the interference layer information and the power ratio indication information are jointly indicated.

2. The method of claim 1, wherein when the indication of the signal indication information by the additional x bits refers to the independent indication of one piece of the signal indication information by n bits, the one piece of the signal indication information comprises the transmission mode, the interference layer information, the power ratio indication information, the precoding information, or the port information.

3. The method of claim 1, wherein when the indication of the signal indication information by the additional x bits refers to the joint indication of two or more than two pieces of the signal indication information by $n_1$ bits, independent indication of one piece of the signal indication information by $n_2$ bits.

4. The method of claim 1, wherein the transmission mode comprises a first transmission mode and a second transmission mode;
wherein the first transmission mode refers to bit stream transmission of different nodes and the second transmission mode refers to bit stream transmission of a same node; or,
the first transmission mode refers to multi-user superposition transmission and the second transmission mode refers to diversity transmission, or single-port transmission or multi-port transmission.

5. The method of claim 1, wherein sending the signal indication information to the receiver and transmitting the signal according to the signal indication information comprises:
processing two groups of bit data streams according to a Gray conversion table to obtain two groups of new bit data streams, combining the two groups of new bit data streams, and sending combined bit stream data to the receiver, wherein a synthesis modulation constellation corresponding to the combined bit stream data is a Gray mapping constellation; or indicating the receiver to be incapable of making a hypothesis about whether transmitted data of another receiver is multiplexed in a same layer or not.

6. The method of claim 1, wherein a port of target user equipment (UE) is 7 and a port of interference UE is 8; or the port of the target UE is 8 and the port of the interference UE is 7.

7. The method of claim 1, wherein the port information comprises port information of one or two or three paired UEs; and the port information is implied in a target port.

8. The method of claim 7, wherein the port information comprises:
existence of an interference signal at an alternative port or not, and a modulation order for the interference signal at the alternative port, wherein the alternative port is determined according to a port of a target UE.

9. The method of claim 1, further comprising:
determining an alternative port set of paired UEs according to a port of a target UE and indicating a port of the paired UEs in an alternative set according to a bit field about whether an interference signal exists or not; and
determining a modulation order for the interference signal at an alternative port in a bit field; wherein the interference signal at the alternative port means a signal on the alternative port.

10. A device for information transmission to execute the method of claim 1, comprising:
a first processing module, configured to send the signal indication information to the receiver and transmit the signal according to the signal indication information.

11. The device of claim 10, wherein the first processing module comprises:
a processing unit, configured to configure specified signaling and, when the specified signaling is enabled, execute at least one of following operations:
processing two groups of bit data streams according to a Gray conversion table to obtain two groups of new bit data streams, combining the two groups of new bit data streams and sending combined bit stream data to the receiver, wherein a synthesis modulation constellation corresponding to the combined bit stream data is a Gray mapping constellation; or
indicating the receiver to be incapable of making a hypothesis about whether transmitted data of another receiver is multiplexed in a same layer or not.

12. The device of claim 10, further comprising:
a second processing module, configured to receive the signal indication information from a transmitter and demodulate a target signal according to the signal indication information.

13. The device of claim 12, wherein the second processing module comprises:
a first demodulation unit, configured to obtain an interference signal by demodulation according to the received signal indication information;
a cancellation unit, configured to cancel the interference signal; and
a second demodulation unit, configured to obtain the target signal by demodulation.

14. A computer storage medium, in which a computer-executable instruction is stored, the computer-executable instruction being configured to execute the method for information transmission according to claim 1.

15. A computer storage medium, in which a computer-executable instruction is stored, the computer-executable instruction being configured to execute the method for information transmission according to claim 2.

* * * * *